United States Patent [19]

Davitt

[11] 4,105,044

[45] Aug. 8, 1978

[54] FLOW CHECK VALVE WITH BIAS SPRING REMOVAL CAPABILITY

[75] Inventor: Joseph J. Davitt, Kalamazoo, Mich.

[73] Assignee: Ward Aero, Inc., Three Rivers, Mich.

[21] Appl. No.: 741,609

[22] Filed: Nov. 15, 1976

[51] Int. Cl.² .................................... F16K 17/28
[52] U.S. Cl. ........................................... 137/517
[58] Field of Search ..................... 137/460, 517, 498

[56] References Cited

U.S. PATENT DOCUMENTS

| 218,024 | 7/1879 | Hennessy et al. ............ 137/517 X |
| 2,929,399 | 3/1960 | MacGowan .................. 137/517 X |
| 3,234,961 | 2/1966 | Arnes ........................... 137/517 |

Primary Examiner—Robert G. Nilson

Attorney, Agent, or Firm—Dressler, Goldsmith, Clement, Gordon & Shore, Ltd.

[57] ABSTRACT

A spring-biased, normally open flow check valve with on-line in-service replacement capability is disclosed. A plug member which prevents reverse flow is disposed within a housing having an orifice for passing forward fluid flow through the valve. The housing is threadingly engaged on one end with a removable spring reaction support member. A helical spring is disposed within the housing for biasing the spherical plug member in a direction away from sealing the orifice. The spring reaction support member may be threadingly disengaged from the valve housing to permit removal and/or replacement of the helical spring without releasing downstream fluid pressure.

1 Claim, 5 Drawing Figures

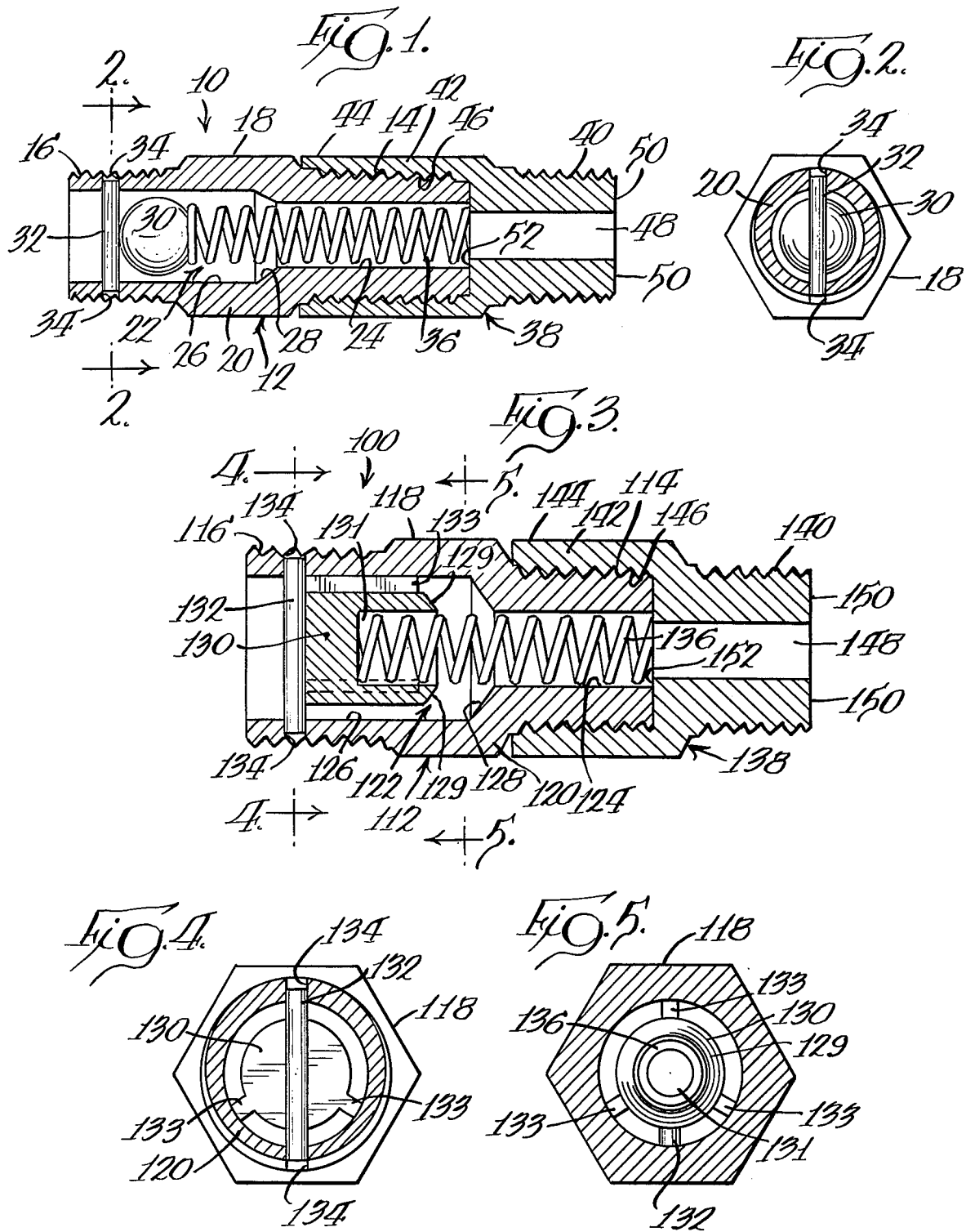

FLOW CHECK VALVE WITH BIAS SPRING REMOVAL CAPABILITY

BACKGROUND OF THE INVENTION

The present invention relates to a flow check valve for fluid systems and more particularly to a spring-biased, normally open check valve which passes fluid flow in a forward direction and prevents passage of flow in a reverse direction. The valve has the unique capability for bias spring removal and replacement while on-line and in-service without affecting the pressure boundary integrity of the downstream portion of the system so long as that portion of the system is under pressure.

In certain fluid systems, either gas or liquid, it is sometimes necessary, or at least desirable, to employ a reverse flow blocking device, or check valve, downstream of certain system components such as pumps as a safety feature so as to prevent backflow of fluid through them which could have deleterious effects. For example, in a crane or jack which is actuated by means of a hydraulic cylinder, should a hose leading to the cylinder develop a leak or should the pump fail, the hydraulic fluid will tend to leave the cylinder rapidly and the crane or jack will no longer support a weight carried thereby. However, if a spring-biased flow check valve is provided in the fluid supply line adjacent to the hydraulic cylinder, the normal resistance of the bias spring present in the valve will be overcome by the flow of the fluid from the cylinder and a valve member within the flow check valve will shut off the fluid flow until necessary repairs can be made.

However, in spring-biased check valves the bias spring may take a set, thus it is desirable to replace the biasing spring from time to time, especially in systems where it is desired to have a check valve that closes at a certain predetermined back pressure. Thus, it is desirable to have a flow check valve wherein in-service replacement of the bias spring can be performed while the valve remains on-line. Also, in some instances it is desirable to have bias spring replacement capability while system pressure is maintained in that portion of the system which is downstream from the flow check valve.

Also, in some systems reaction products, sludge products, corrosion products, erosion products, or the like may form and circulate within the system. The existence of such products may depend, in part, upon the fluid, system component materials, flow velocities, temperature, pressure, or upon other physical, chemical, and thermodynamic properties. These products tend to be created at and/or lodge in areas of the system which are subject to step changes, or large gradients, in temperature, pressure, and velocity, or in areas at material interfaces. Most often, the products accumulate in areas of reduced diameter or around projections into the flow stream. Thus, the products can accumulate on the portions of valves which project into the flow stream. Consequently, valves, and particularly check valves, which may have plug members, cage guides, seat rings, shaft members, and other valve trim which project into the flow stream or which are of materials different from other parts of the valve or piping system, can become a trap for flowing crud products, if not actual producing points of such products.

U.S. Pat. No. 2,375,498 to Seymour discloses a fluid lockout device which utilizes a resilient, yieldable valve member capable of permanently sealing a hydraulic conduit within which a substantial portion of the valve member is received. However, the bias spring present in the device of Seymour cannot be removed or replaced without complete disassembly of the device and attendant release of the downstream pressure.

SUMMARY OF THE INVENTION

In accordance with this invention, a flow check valve having a bias spring is provided with a novel internal configuration and removable support member which permits access to the valve internals to replace the bias spring and, if desired, allow in-service inspection of the valve while the valve is on-line in a downstream pressurized system. The flow check valve of this invention is particularly well suited for hydraulically actuated cranes, jacks, and the like, used for aircraft maintenance.

In a preferred embodiment, the valve is substantially cylindrical and contains an internal passage comprised of three different cylindrical passages or bores in end-to-end relationship to one another and of differing diameters. A housing for receiving a plug member is provided with a cylindrical exterior threaded upstream end, an exterior hexagonal middle portion, and a cylindrical exterior threaded outlet end. Internally, the housing has an interior chamber comprising a cylindrical upstream passage and a cylindrical downstream passage which has a larger diameter than the upstream passage and which is joined to the upstream passage by a frusto-conical seat defining an orifice therethrough. A plug member, or ball, is loosely disposed within the cylindrical downstream passage and is adapted for seating against the frusto-conical seat. At the outlet end of the downstream passage is a retaining pin, or rod, disposed across the diameter thereof and at each end received within one of two opposed holes in the wall of the downstream passage for retaining the spherical plug member within the downstream passage when the plug member is displaced from the seat in response to forward fluid flow through the valve.

Except during reverse flow, the spherical plug member is maintained off of, and away from, the seat and biased in a direction toward the plug member retaining pin by a helical spring which is disposed within the interior chamber of the housing with one end being disposed within the upstream cylindrical passage. The end of the spring disposed within the upstream cylindrical passage is retained therein by abutment against a spring reaction support member.

The spring reaction support member is a cylindrical body with an exterior threaded inlet end and a depending peripheral flange. The flange has a hexagonal exterior surface and a cylindrical inner surface threadingly engaged with the exterior threaded upstream end of the plug member housing. The spring reaction support member further has an interior cylindrical inlet passage which communicates between the exterior inlet end of the support member and the cylindrical upstream passage of the plug member housing. The interior cylindrical inlet passage of the support member has a smaller diameter than the cylindrical upstream passage of the housing. The longitudinal axis of the support member interior cylindrical inlet passage is in alignment with the longitudinal axis of the cylindrical upstream passage of the plug member housing. Thus, the support member presents an annular face defined by the area between the concentric ends of the support member inlet passage and the upstream passage of the plug member housing. The end of the helical spring abuts this annular face.

The support member may be threadingly disengaged from the plug member housing to allow removal of the helical spring. This permits replacement of the helical bias spring, and also permits inspection and cleaning of the upstream passage of the housing. Removal of the support member and spring can be accomplished when the valve housing is on-line and under pressure from the downstream portion of the system to which it is connected.

Numerous other advantages and features of the present invention will become readily apparent from the following detailed description of the invention and the modification thereof, from the claims and from the accompanying drawings in which each and every detail shown is fully and completely disclosed as a part of the specification.

BRIEF DESCRIPTION OF THE DRAWINGS

FIG. 1 is a cross-sectional view of the flow check valve of this invention;

FIG. 2 is a cross-sectional end view taken along the plane 2—2 of FIG. 1;

FIG. 3 is a partial cross-sectional view of another flow check valve embodying this invention;

FIG. 4 is a cross-sectional end view taken along plane 4—4 of FIG. 3; and

FIG. 5 is a cross-sectional view taken along plane 5—5 of FIG. 3.

DESCRIPTION OF THE PREFERRED EMBODIMENT

While this invention is susceptible of embodiment in many different forms, there is shown in the drawings and will herein be described in detail a preferred embodiment of the invention and modifications thereof, with the understanding that the present disclosure is to be considered as an exemplification of the principles of the invention and is not intended to limit the invention to the embodiments illustrated. The scope of the invention will be pointed out in the appended claims.

In the following description, two digit numerals are used to refer to the embodiment illustrated in FIGS. 1 and 2 and three digit numerals in the one hundred series are used to refer to the embodiment illustrated in FIGS. 3 through 5. The same last two digits in each numeral designate similar or functionally analogous elements in the various embodiments.

Referring now to FIGS. 1 and 2, which illustrate a preferred embodiment of this invention, a flow check valve is designated generally by reference numeral 10. Plug member housing 12 is provided with cylindrical exterior threaded upstream end 14 and cylindrical exterior threaded outlet end 16. Between the two threaded ends is hexagonal exterior middle portion 18.

Plug member housing 12 has wall 20, the interior surface of which defines interior chamber 22. Interior chamber 22 is comprised of two smaller cylindrical chambers aligned end to end: cylindrical upstream passage 24 and a cylindrical downstream passage 26. Upstream passage 24 and downstream passage 26 lie on the same longitudinal axis. The diameter of downstream passage 26 is greater than the diameter of upstream passage 24. The smaller diameter upstream passage 24 is joined to the larger diameter downstream passage 26 by a frusto-conical surface which defines valve seat 28 and an orifice between upstream and downstream passages 24 and 26, respectively, through which fluid may flow.

Disposed within cylindrical downstream passage 26 is spherical plug member 30 of a diameter less than the diameter of downstream passage 26 and which is adapted for sealing against seat 28 to block the orifice in response to reverse fluid flow through valve 10. Plug member retaining means, or retaining pin or rod 32, is disposed across the diameter of cylindrical downstream passage 26 and engaged on each end with one of two opposed retaining pin holes 34 which are 180 degrees apart on the diameter of downstream passage 26. Pin 32 is retained within holes 34 by a friction fit or other suitable means. Retaining pin 32 retains spherical plug member 30 within downstream passage 26 when plug member 30 is displaced from seat 28 in response to forward fluid flow (and/or in response to biasing means 36 as described hereinbelow).

A biasing means, specifically a cylindrical helical spring of circular cross-section 36, is disposed within interior chamber 22 with one end of the spring being disposed within upstream passage 24. Spring 36 functions to bias spherical plug member 30 in a direction away from seat 28 and toward retaining pin 32.

Helical compressing spring 36 biases spherical plug member 30 off of seat 28 during conditions of no flow or forward flow through valve 10. During conditions of reverse flow, when the consequent downstream pressure exceeds the pressure upstream of valve 10, spherical plug member 30 is urged against one end of spring 36 and compresses spring 36 until spherical plug member 30 seats against seat 28 in sealing engagement to prevent reverse flow through valve 10. The end of spring 36 opposite spherical plug member 30 is supported against its compressive reaction by a bias reaction support means, specifically, spring reaction support member 38 which has a generally cylindrical body with an exterior threaded inlet end 40 and a depending peripheral flange 42 which has hexagonal exterior surface 44 and threaded cylindrical inner surface 46 threadingly engaged with exterior threaded upstream end 14 of plug member housing 12.

Spring support member 38 has interior cylindrical inlet passage 48 communicating between inlet end 50 and upstream passage 24. Cylindrical inlet passage 48 has a diameter which is less than the diameter of upstream passage 24 and has a longitudinal axis which is coincident with the longitudinal axis of upstream passage 24. Annular face 52 is defined as the area between the concentric ends of support member cylindrical inlet passage 48 and interior chamber upstream passage 24. Annular face 52 serves to support the abutting end of helical spring 36.

In operation, normal forward flow through check valve 10 is from right to left as viewed in FIG. 1, and reverse flow is, of course, from left to right. During those system conditions when a flowing fluid in valve 10 tends to reverse direction from the forward flow direction to the reverse flow direction, spherical plug member 30 is moved, in response to the initial surge of reverse flow, against seat 28 and is held thereon by the downstream pressure which, of necessity, is greater than the upstream pressure during such reverse flow condition. With spherical plug member 30 seated against seat 28, and with the downstream pressure being continually applied and being greater than the upstream pressure, it is possible to disconnect the piping system from the upstream end, or threaded inlet end 40, of valve 10. Support member 38 can be threadingly disengaged from housing 12 by suitable means, such as by application of a wrench to hexagonal surface 44. To prevent plug member housing 12 from becoming loosened from threading engagement with the downstream piping, another wrench may be engaged with hexagonal exterior middle portion 18 of housing 12 to hold housing 12 while support member 38 is being unscrewed. Removal of support member 38 permits access to spring 36, thus spring 36 can be readily removed from upstream passage 24 for replacement while the downstream pressure is maintained in the downstream piping and against spherical plug member 30.

The flow check valve of this invention is advantageously used in certain hydraulic systems, and particularly in hydraulic systems for cranes and jacks wherein it is desired to have the capability to modify the sensitivity to reverse flow. That is, the rate of full blockage of reverse flow surges can be varied to achieve different minimum response times. The removable spring reaction support member allows the biasing spring to be replaced with a spring having a greater or lesser spring rate so as to provide a decreased or increased responsiveness to the reverse flow surge of hydraulic fluid or to replace a spring that has taken a set.

A modification of the invention is shown in FIGS. 3 through 5. The flow check valve is designated generally by reference numeral 100 in FIG. 3. Plug member housing 112 is provided with cylindrical exterior threaded upstream end 114 and cylindrical exterior threaded outlet end 116. Between the two threaded ends is hexagonal exterior middle portion 118.

Plug member housing 112 has wall 120, the interior surface of which defines interior chamber 122. Interior chamber 122 is comprised of two smaller cylindrical chambers aligned end to end: cylindrical upstream passage 124 and a cylindrical downstream passage 126. Upstream passage 124 and downstream passage 126 lie on the same longitudinal axis. The diameter of downstream passage 126 is greater than the diameter of upstream passage 124. The smaller diameter upstream passage 124 is joined to the larger diameter downstream passage 126 by a frusto-conical surface or valve seat 128. Valve seat 128 defines an orifice between upstream and downstream passages 124 and 126, respectively, through which fluid may flow.

Plug member 130 is disposed within downstream passage 126. Plug member 130 is substantially cylindrical in shape with a recessed cylindrical cup 131 on one end and with a frusto-conical plug seating surface 129 peripherally disposed around cup 131. Frusto-conical plug seating surface 129 is adapted to mate with, and sealingly engage, frusto-conical seat 128. Disposed at 120° intervals around the periphery of plug member 130, and parallel to the longitudinal axis of cylindrical plug member 130, are three spacer guides 133 which orient plug member 130 about the center line, or longitudinal axis, of downstream passage 126 to (1) properly align frusto-conical plug member seating surface 129 with seat 128 and (2) to provide fluid flow space between the walls of downstream passage 126 and plug member 130.

Plug member retaining means, or retaining pin 132 is disposed across the diameter of cylindrical downstream passage 126 and engaged on each end with one of two opposed retaining pin holes 134 which are 180° apart on the diameter of downstream passage 126. Pin 132 is retained within holes 134 by a friction fit or other suitable means. Retaining pin 132 retains cylindrical plug member 130 within downstream passage 126 when plug member 130 is displaced from seat 128 in response to forward fluid flow (and/or in response to biasing means 136 as described below).

A biasing means, specifically a cylindrical helical spring of circular cross-section 136, is disposed within interior chamber 122 with one end of the spring being disposed within upstream passage 124. Spring 136 functions to bias plug member 130 in a direction away from seat 128 and toward retaining pin 132.

Spring 136 biases plug member 130 off of seat 128 during conditions of no flow or forward flow through valve 100. During conditions of reverse flow, when the consequent downstream pressure exceeds the pressure upstream of valve 100, plug member 130 is forced against one end of spring 136 and compresses spring 136 until plug member 130 seats against seat 128 in sealing engagement to prevent reverse flow through valve 100. The end of spring 136 opposite spherical plug member 130 is supported against its compressive reaction by a bias reaction support means, specifically, spring reaction support member 138 which has a generally cylindrical body with an exterior threaded inlet end 140 and a depending peripheral flange 142 which has hexagonal exterior surface 144 and threaded cylindrical inner surface 146 threadingly engaged with exterior threaded upstream end 114 of plug member housing 112.

Spring support member 138 has interior cylindrical inlet passage 148 communicating between inlet end 150 and upstream passage 124. Cylindrical inlet passage 148 has a diameter which is less than the diameter of upstream passage 124 and has a longitudinal axis which is coincident with the longitudinal axis of upstream passage 124. Annular face 152 is defined as the area between the concentric ends of support member cylindrical inlet passage 148 and interior chamber upstream passage 124. Annular face 152 serves to support the abutting end of helical spring 136.

Removal of spring support member 138 from valve 100 permits maintenance and inspection of spring 136.

A valve in accordance with the present invention may have a variety of shapes and end connections. The exterior of the valve could be cylindrical or even prismatic. The spring support member could be secured to the plug member housing also with a flat face, gasketed bolted flange connection which would permit the valve to be disassembled while on-line without the removal of the mating upstream flanged pipe spool.

It is thus seen that the present invention provides the novel check valve which may be replaced or inspected while on-line and in-service in a fluid system. Inspection and cleaning of some of the parts of the check valve are possible while the check valve is on-line and under downstream pressure.

It will be apparent that the check valve of this invention provides a number of advantages. Although but a few embodiments have been illustrated, those skilled in the art will appreciate that the check valve may take a variety of forms without departing from the spirit and scope of the present invention.

I claim:

1. A flow check valve with on-line in-service inspection capability comprising:
   a plug member housing having an orifice for passing forward fluid flow through said valve defined by a peripheral seat in the housing; said housing having a wall means with an exterior surface and an interior surface defining an interior chamber, a cylindrical exterior threaded outlet end, a hexagonal exterior middle portion, and a cylindrical exterior threaded upstream end; said interior chamber having a cylindrical upstream passage on one side of said seat and a cylindrical downstream passage on the other side of said seat and having a larger diameter than said upstream passage; said seat being a frusto-conical portion of said interior surface situated between said cylindrical upstream passage and said cylindrical downstream passage; said wall means having a pair of retaining pin holes on a diameter of said downstream passage, each hole passing through said wall means from said downstream passage radially outwardly to said exterior surface;

a spherical plug member having a diameter less than the diameter of said downstream passage, disposed within said downstream passage, and adapted for sealing against said seat to block said orifice in response to reverse fluid flow through said valve;

a solid cylindrical retaining pin disposed across the diameter of said downstream passage and received at each end within one of said retaining pin holes for retaining said plug member within said downstream passage when the plug member is displaced from said seat in response to said forward flow;

a helical compression spring disposed within said interior chamber with one end thereof extending within said upstream passage for biasing said plug member in a direction away from said seat and toward said retaining pin; and a spring reaction support member, having a substantially cylindrical body with an exterior-threaded inlet end, a depending peripheral flange having a hexagonal exterior surface and a cylindrical inner surface threadingly engaged with said exterior-threaded upstream end of said plug member housing, and an interior cylindrical inlet passage communicating between said inlet end and said interior chamber upstream passage, said inlet passage being of smaller diameter than said upstream passage and aligned on the same longitudinal axis as said upstream passage, whereby an annular face on said spring reaction support member is defined by the area between the concentric ends of said support member inlet passage and said interior chamber upstream passage for supporting the other end of said helical compression spring.

* * * * *